(12) United States Patent
Larson et al.

(10) Patent No.: US 6,578,131 B1
(45) Date of Patent: Jun. 10, 2003

(54) SCALEABLE HASH TABLE FOR SHARED-MEMORY MULTIPROCESSOR SYSTEM

(75) Inventors: Per-Ake Larson, Redmond, WA (US); Murali R. Krishnan, Redmond, WA (US); George V. Reilly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/300,715

(22) Filed: Apr. 27, 1999

(51) Int. Cl.$^7$ .............................................. G06F 12/06
(52) U.S. Cl. ...................................... 711/216; 711/170
(58) Field of Search ........................ 707/100; 711/216, 711/170

(56) References Cited

U.S. PATENT DOCUMENTS

| | | | |
|---|---|---|---|
| 5,706,462 A | | 1/1998 | Matousek |
| 5,812,996 A | * | 9/1998 | Rubin et al. ................. 711/118 |
| 5,897,637 A | * | 4/1999 | Guha .......................... 707/100 |
| 6,247,108 B1 | * | 6/2001 | Long ........................... 707/100 |

OTHER PUBLICATIONS

Ellis, C. Concurrency in Linear Hashing. ACM Transactions on Database Systems, vol. 12, No. 2, Jun. 1987, pp. 195–217.*

R. Fagin, J. Nievergelt, N. Pippenger, and H.R. Strong, "Extendible Hashing—A Fast Access Method for Dynamic Files," *ACM Transactions on Database Systems*, 1979, Issues 3,4, pp. 315–344.

G.N.N. Martin, "Spiral Storage: Incrementally Augmentable Hash Addressed Storage," *IBM Technical Disclosure Bulletin*, Mar. 1982, vol. 24, No. 10, pp. 4946–4949.

J.K. Mullin, "Spiral Storage: Efficient Dynamic Hashing with Constant Performance," *The Computer Journal*, 1985, vol. 28, No. 3, pp. 330–334.

Per-Ake Larson, "Dynamic Hashing," *BIT 18*, (1978), pp. 184–201.

Per-Ake Larson, Dynamic Hash Tables, *Communications of the ACM*, Apr. 1988, vol. 31, No. 4, pp. 446–457.

W. Litwin, "Linear Hashing: A New Tool for File and Table Addressing," *Proceedings of the 6$^{th}$Conference on Very Large Databases*, 1981, pp. 212–223.

Robert Morris, "Scatter Storage Techniques," *Communications of the ACM*, Jan. 1968, vol. 11, No. 1, pp. 38–44.

Knuth, Donald E., "The Art of Computer Programming," Second Edition, 1998, Addison–Wesley, pp. 513–558.

* cited by examiner

*Primary Examiner*—Kevin L. Ellis
(74) *Attorney, Agent, or Firm*—Lee & Hayes, PLLC

(57) ABSTRACT

A scaleable hash table for shared memory multi-processor (SMP) that supports very high rates of concurrent operations (e.g., insert, delete, and lookup), while simultaneously reducing cache misses. The SMP system has a memory subsystem and a processor subsystem interconnected via a bus structure. The hash table is stored in the memory subsystem to facilitate access to data items. The hash table is segmented into multiple buckets, with each bucket containing a reference to a linked list of bucket nodes that hold references to data items with keys that hash to a common value. Individual bucket nodes contain multiple signature-pointer pairs that reference corresponding data items. Each signature-pointer pair has a hash signature computed from a key of the data item and a pointer to the data item. The first bucket node in the linked list for each of the buckets is stored in the hash table. To enable multithread access, while serializing operation of the table, the SMP system utilizes two levels of locks: a table lock and multiple bucket locks. The table lock allows access by a single processing thread to the table while blocking access for other processing threads. The table lock is held just long enough for the thread to acquire the bucket lock of a particular bucket node. Once the table lock is released, another thread can access the hash table and any one of the other buckets.

70 Claims, 9 Drawing Sheets

SCALEABLE HASH TABLE FOR SHARED-MEMORY MULTIPROCESSOR SYSTEM

TECHNICAL FIELD

This invention relates to memory systems and hash tables used in the memory systems. More particularly, this invention relates to shared-memory multiprocessor systems that utilize hash tables to facilitate data access.

BACKGROUND

Hashing is an efficient and popular technique for fast lookup of items based on a key value. Most research on hash tables has focused on programs with a single thread of control. However, many modern applications are multithreaded and run on multiprocessor systems. Server applications such as web servers, database servers, and directory servers are typical examples. Server applications often make use of one or more software caches to speed up access to frequently used items. The number of items in a cache may very greatly, both over time and among installations.

Hashing is often used to provide fast lookup of items in a cache. In this context, the hash table becomes a shared, global data structure that should grow and shrink automatically with the number of items and that must be able to handle a high rate of concurrent operations (insert, lookup, and delete), all without wasting memory.

The inventors have developed a hashing scheme designed to meet these requirements.

Some programmers still believe that hash tables have to be of fixed size. That is, the table size has to be determined in advance and stays fixed thereafter. In the late 1970s, several researchers proposed schemes that allowed hash files to grow and shrink gradually in concert with the number of records in the file. Two methods—linear hashing and spiral storage—were subsequently adapted for main-memory hash tables. The system developed by the inventors uses hashing techniques that are based on linear hashing. Accordingly, spiral storage is not addressed in this disclosure.

Linear Hashing

A higher load on a hash table increases the cost of all basic operations: insertion, retrieval, and deletion. If performance is to remain acceptable when the number of records increases, additional storage must somehow be allocated to the table. The traditional solution is to create a new, larger hash table and rehash all the records into the new table. Typically, the new hash table is twice the size of the old one.

In contrast to the traditional solution, linear hashing allows a smooth growth in the table size. The table grows gradually, one bucket at a time, rather than doubling in size. When a new bucket is added to the address space, a limited local reorganization is performed. Linear hashing was developed by W. Litwin for external files (see, Linear Hashing: A new tool for file and table addressing, Proceedings of the 6th Conference on Very Large Databases (VLDB '81), 1981, pgs. 212–223) and adapted to in-memory hash tables by P.-Å. Larson (see, Dynamic Hash Tables, Communications of the ACM, Vol. 31, No 4, 1988, pgs. 446–457).

To briefly describe linear hashing, consider a hash table consisting of N buckets with addresses 0, 1 . . . N–1. Linear hashing increases the address space gradually by splitting the buckets in a fixed order: first bucket 0, then bucket 1, and so on, up to and including bucket N–1. When a bucket is split, about half of its records are moved to a new bucket at the end of the table.

FIG. 1 illustrates the splitting process in linear hashing for an example table 20 with five buckets (N=5). A pointer p keeps track of the next bucket to be split. FIG. 1 shows the table 20 at four different growth stages: A, B, C, and D.

At stage A, the first bucket 0 is split, with part of its records being transferred to new bucket 5. At stage B, the second bucket 1 is split and some of the records are moved to new bucket 6. Stage C shows splitting the fifth and last of the original buckets—bucket 4 (i.e., N–1)—and migrating some of the records to new bucket 9.

When all N buckets have been split and the table size has doubled to 2N, the pointer p is reset to zero and the splitting process starts over again, as shown in stage D. This time, the pointer travels from 0 to 2N–1, doubling the table size to 4N. This expansion process can continue as long as is required.

FIG. 2 illustrates how each bucket is split. In this example, bucket 0 of the exemplary five-bucket hash table 20 is split. The hash table is illustrated both before and after expansion to a sixth bucket.

An entry in the hash table 20 contains a single pointer 24, which is the head of a linked list 26 connecting all records that hashed to that address. When the table is of size five (i.e., five buckets), all records are hashed by the function $h_0(K)=K \bmod 5$. Once the table size has doubled to ten (i.e., ten buckets), all records will be addressed by the function $h_1(K)=K \bmod 10$. However, as illustrated in FIG. 1, linear hashing allows the table to expand one bucket at a time rather than doubling the table size immediately.

For this example, consider keys that hash to bucket 0. Under the hashing function $h_0(K)=K \bmod 5$, the last digit of the key must be either 0 or 5. The linked list 26 shows records that end in either 0 or 5. Under the hashing function $h_1(K)=K \bmod 10$, keys with the last digit equal to 0 still hash to bucket 0, while those with the last digit equal to 5 hash to bucket 5. None of the keys hashing to buckets 1, 2, 3, or 4 under function $h_0$ can possibly hash to bucket 5 under function $h_1$.

To expand the table, a new bucket (with address 5) is allocated at the end of the table and the pointer p is incremented by one. The process scans through the records of bucket 0 and relocates to the new bucket 5 all records that hash to 5 under $h_1(K)=K \bmod 10$. In this example, records "345" and "605" are transferred from bucket 0 to new bucket 5. The records in buckets 1–4 remain unaffected.

As the table size changes, record addresses for various records affected by the expansion (or contraction) also change. The current address of a record can, however, be computed quickly. Given a key K, a value for $h_0(K)$ is computed. If $h_0(K)$ is less than the current value of p, the corresponding bucket has already been split; otherwise, the corresponding bucket has not been split. If the bucket has been split, the correct address of the record is given by $h_1(K)$. When all original buckets 0–4 have been split and the table size has increased to ten, all records are addressed by $h_1(K)$, which becomes the new $h_0(K)$ for N=10.

The address computation can be implemented in several ways, but the following solution appears to be the simplest. Let g be a normal hashing function producing addresses in some interval [0, M], where M is sufficiently large, say, $M>2^{20}$. To compute the address of a record, the following sequence of hashing functions is employed:

$$h_i(K)=g(K) \bmod (N \times 2^i), i=0, 1, \ldots$$

where N is the minimum size of the hash table. (It is noted that if N is a power of two, the modulo operation reduces to extracting the last bits of g(K).) The hashing function g(K) can be implemented in several ways. Functions of the type g(K)=(cK) mod M, where c is a constant and M is a large prime have experimentally been found to perform well. Different hashing functions are easily obtained by choosing different values for c and M.

The current state of the hash table is tracked by two variables:

L=number of times the table size has doubled (from its minimum size, N); and p=pointer to the next bucket to be split, $p<N\times 2^L$.

Given a key K, the current address of the corresponding record can be computed as follows:

$$addr=h_L(K) \qquad 1.$$

$$if(addr<p) \text{ then } addr=h_{L+1}(K) \qquad 2.$$

Contracting the table by one bucket is exactly the inverse of expanding it by one bucket. First, the state variables are updated and then all records of the last bucket are moved to the bucket referenced by pointer p, and the last bucket is freed.

The discussion thus far has focused on how to expand or contract the hash table, but not when to do so. One way to determine when a hash table should undergo a size change is to bound the "overall load factor" of the table and to change table size when the overall load factor crosses over the bounds. The "overall load factor" is defined as the number of records in the table divided by the (current) number of buckets; i.e., the average chain length. A lower bound and an upper bound are established for the overall load factor and table is expanded (contracted) whenever the overall load factor goes above (below) the upper (lower) bound. To support this decision mechanism, the hash table must track the current number of records in the table, in addition to the state variables L and p.

Challenges for Shared-Memory Multiprocessor Systems

As noted above, many modern applications are multi-threaded and run on shared-memory multiprocessor (SMP) systems. There are many challenges in constructing a scaleable hashing mechanism that accommodates the needs of this type of applications. Among the main challenges are reducing lock contention so that many threads can access the same hash table concurrently and reducing cache misses to improve overall access speed and performance.

Lock Contention

In multithreaded applications, many threads need access to the same hash tablet concurrently. Problems arise in that concurrently accessing threads can disrupt one another. One thread may cause the hash table to change or scale in size, while another thread is in the process of using the table for its own purpose.

One conventional approach to avoiding this problem is by using a single, global lock that protects all access to the table. When a thread gains access to the table, lit locks the table so that no other thread can use the table until the first thread is finished. The single lock serializes all operations on the table so that they cannot possibly interfere with each other.

For multithreaded applications with many concurrent threads, serialized operation on the hash table easily becomes a bottleneck resulting in poor scalability. This bottleneck restricts or even negatively impacts an application's ability to scale. That is, adding more processors may not only fail to increase throughput but may sometimes even decrease throughput.

The inventors have developed a scaleable hash table that permits many operations on the hash table to proceed concurrently, resulting in excellent scalability.

Cache Miss Problems

All modern CPUs rely on multilevel processor caches to bridge the latency gap between memory and processors. The cost of a complete cache miss is substantial in the cycles wasted while the processor is stalled waiting for data to arrive from memory. Today, it is already as high as 100 cycles on some processors and it is expected to get worse.

Accordingly, there is a need to improve performance by reducing the number of cache misses. The inventors have devised a hash table that utilizes a cache-friendly data structure and hashing algorithm to reduce cache misses and page faults.

SUMMARY

This invention concerns a scaleable hash table that supports very high rates of concurrent operations on the hash table (e.g., insert, delete, and lookup), while simultaneously reducing cache misses. The hash table is designed to meet the requirements of multithreaded applications running on shared-memory multiprocessors (SMP), but may be used by any application.

According to one implementation, the hash table is used by an application running on a shared-memory multiprocessor system with a memory subsystem and a processor subsystem interconnected via a bus structure. The processor subsystem has multiple microprocessors that are coupled to share the data resources on the memory subsystem. Each microprocessor has a central processing unit and cache memory (e.g., multilevel L1 and L2 caches).

The memory subsystem is a hierarchical memory system having a nonvolatile main memory (e.g., nonvolatile RAM) and persistent stable storage (e.g., disks, tape, RAID, etc.). A hash table is stored in the main memory to facilitate access to data items kept in the main memory or stable storage. The hash table consists of multiple buckets, where each bucket comprises a linked list of bucket nodes that hold references to data items whose keys hash to a common value or address. A suitable hashing function can be selected to provide an approximately even distribution of data items across the buckets.

Individual bucket nodes contain multiple signature-pointer pairs that reference corresponding data items. Each signature-pointer pair has a hash signature computed from a key of the data item and a pointer to the data item. The number of signature-pointer pairs in one bucket node is selected so that they fill one or more cache lines exactly when stored in the processors cache. In one implementation, each bucket holds seven signature-pointer pairs, which can be loaded conveniently into two 32-byte cache lines. In another implementation, three signature-pointer pairs were found to be effective.

When using two cache lines, the pairs are laid out in an arrangement that places the signatures in the first cache line and the pointers in the second cache line. The first cache line also holds a (spin) lock and the second cache line also stores a pointer to the next bucket node on the list.

The hash table is configured to store the first bucket node in the linked list for each of the buckets. Thus, the multiple signature-pointer pairs for the bucket are kept in the hash table, rather than just a pointer to the first node. This helps reduce potential cache misses.

To enable high rates of concurrency, while serializing access to sections of the table, the hash table utilizes two levels of locks: a higher level table lock and multiple lower level bucket locks. The table lock is held just long enough for a thread to set the bucket lock of a particular bucket. Once the table lock is released, another thread can access the hash table and any one of the non-locked buckets. In this manner, multiple threads can be conducting concurrent operations on the hash table (e.g., insert, delete, and lookup).

In another implementation, the hash table is further partitioned into multiple separate subtables, where each subtable is itself a linear hash table as described above. In this implementation, multiple subtable locks are used to govern access to the subtables, with underlying bucket locks governing access to individual buckets.

BRIEF DESCRIPTION OF THE DRAWINGS

FIG. 2 shows how a bucket is split and records transferred from an old bucket to a new bucket.

FIG. 11 shows scalability for seven different arrangements of the SMP system.

The same numbers are used throughout the figures to reference like components and features.

DETAILED DESCRIPTION

This invention concerns a scaleable hash table that supports very high rates of concurrent operations (e.g., insert, delete, and lookup), while simultaneously reducing cache misses. For discussion purposes, the invention is described in the context of a shared-memory multiprocessor system (SMP). However, aspects of this invention may be employed in a uni-processor system.

System

Figure 3:
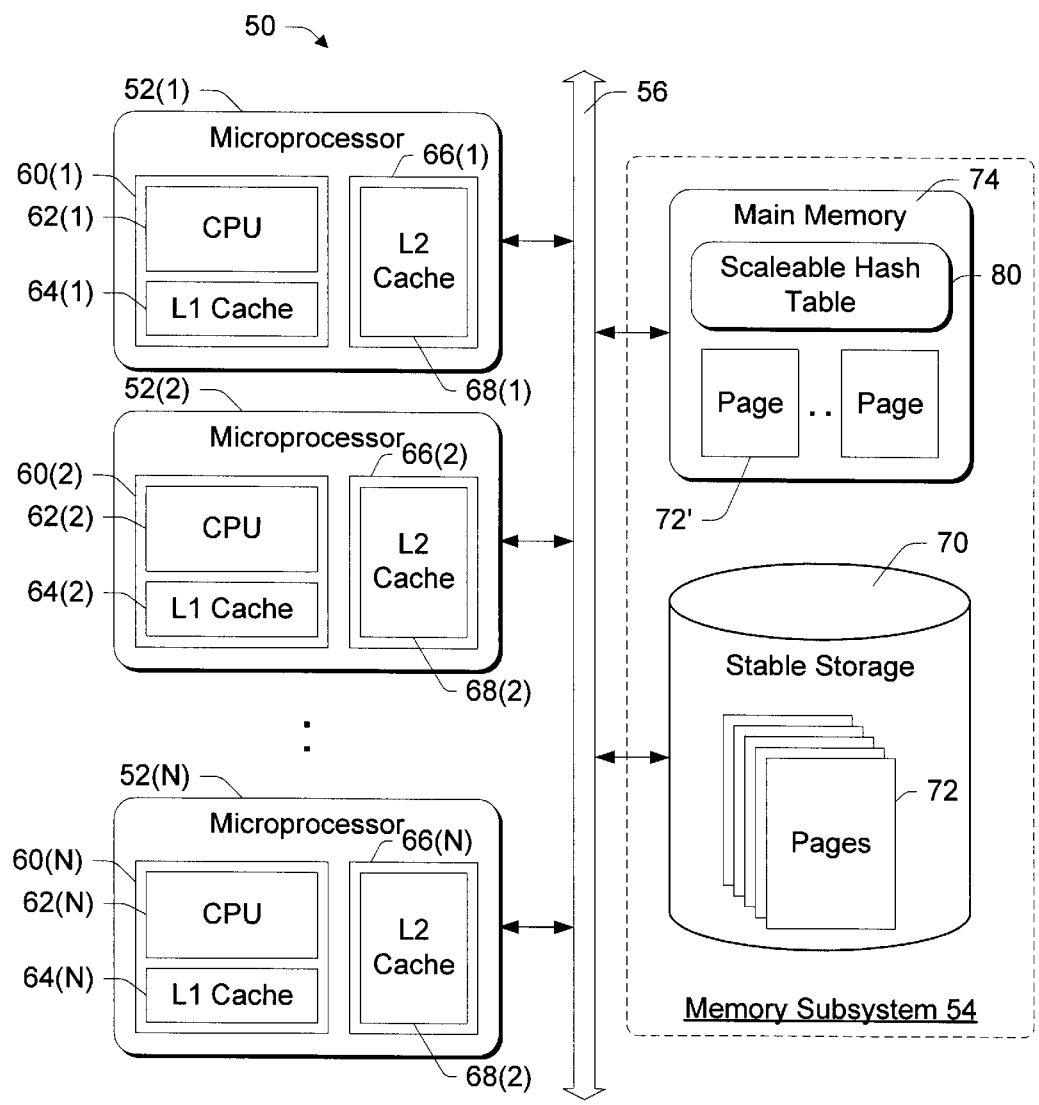
FIG. 3 is a block diagram of a shared-memory multiprocessor (SMP) system.

FIG. 3 shows a shared-memory multiprocessor system 50 having multiple processors 52(1), 52(2), ..., 52(N) coupled to a shared memory subsystem 54. A system bus (or other interconnection network) 56 interconnects the processors 52(1)–52(N) and memory subsystem 54.

Each processor 54 has a chip 60 that holds a CPU (central processing unit) 62 and a first level (or L1) cache 64. Each processor 54 also has a second level (or L2) cache 68 that may be on the same or a different chip (as represented by chip 66). The L1 cache 64 is considerably smaller than the L2 cache 68. For example, the L1 cache 64 typically ranges in size from 16K bytes to 256K bytes, whereas the L2 cache 68 typically varies from 128K bytes up to 4M bytes. Due to its proximity to the CPU 62, however, the L1 cache 64 has a significantly lower access time in comparison to the L2 cache 68. Typically, the access time to remote L2 cache 68 is five times longer than the access time to L1 cache 64.

The memory subsystem 54 has a persistent storage 70 that provides the bulk of the data storage. The persistent storage 70 is stable and persists across system crashes. Examples of such storage include disk, RAID (redundant array of independent/inexpensive disks) storage systems, tape systems, and so forth. Data is typically stored in storage 70 as individual units, known as "pages" 72.

The memory subsystem 54 also has a main memory 74 that comprises volatile memory, non-volatile memory, or a combination of both. During program execution, pages not immediately required may be written to stable storage 70 (paged out) and later read from stable storage 70 to main memory 74 when needed (paged in). A virtual storage manager (not shown) manages movement of pages between the main memory 74 and stable storage 70.

The shared-memory multiprocessor system 50 forms a hierarchical memory system having tiers ranging from small, high speed memory (e.g., L1 cache 64) to large, slow access memory (e.g., stable storage 70). As certain data is requested, one or more data page(s) 72 containing that data is read from storage 70 into main memory 74. An entire page, or portions thereof, can then be loaded into L2 cache 66, depending upon the cache size. Excerpts from the data in L2 cache 68 can be further loaded into L1 cache 64 for highest access speed.

Main memory 74 maintains a hash table 80, which is a scaleable hash table that expands or contracts as needed to facilitate data access requests. All processors 52(1)–52(N) use the same hash table 80 to quickly locate required records, based on their key value, among a set of records stored in the main memory 74. The objective is to enable the processors 52 to perform many concurrent operations on the hash table (e.g., insert, delete, and lookup), without imposing significant waiting periods while one processor waits for another processor to finish using the table. Prior art systems have tended toward a single global lock on the hash table at the expense of imposing long waiting periods While the table is locked. Part of the current solution involves cleverly using locks at various points and times in the hash table 80 to reduce or minimize lock contentions, thereby allowing more processors to access the table concurrently.

The hash table 80 is also designed to reduce cache misses, another problem that threatens overall access speed and performance. Each time a processor 52 seeks to read a data item (a byte, word, double word or quad word), it first goes to L1 cache 64, then to the L2 cache, and then out to the memory subsystem 54. Every miss (meaning the data is not found) gets progressively more expensive in terms of access time and performance speed. Clearly, reading a page 72 from the stable storage 70 to main memory 74 is the most expensive procedure.

Cache misses may significantly increase the time for accessing and traversing the hash table data structure.

Figure 1:
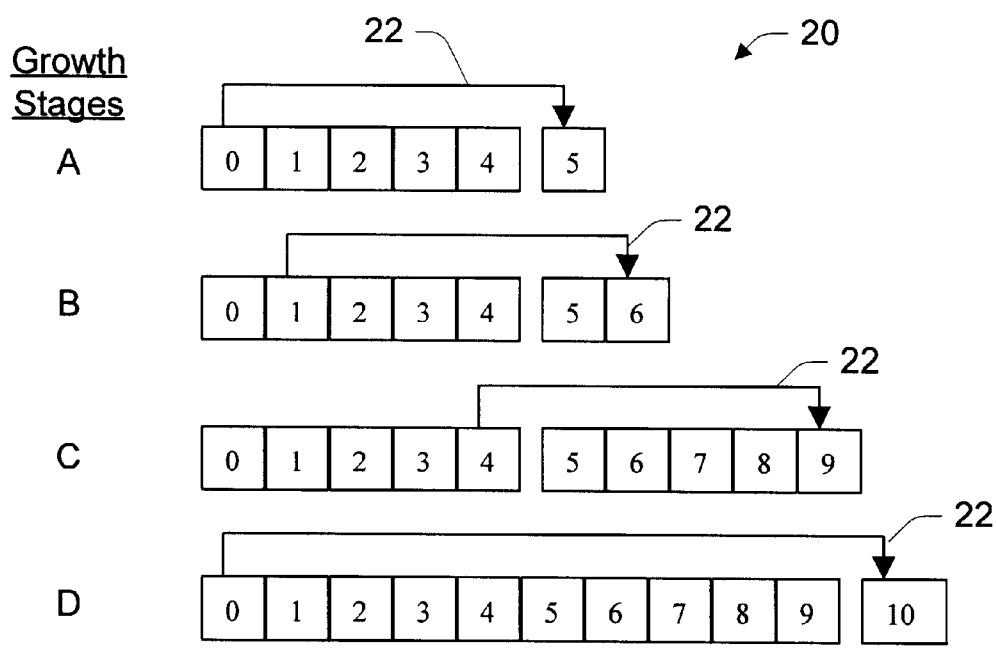
FIG. 1 is a diagrammatic illustration of a conventional hash table at various stages of growth resulting from linear hashing techniques.
Figure 2:
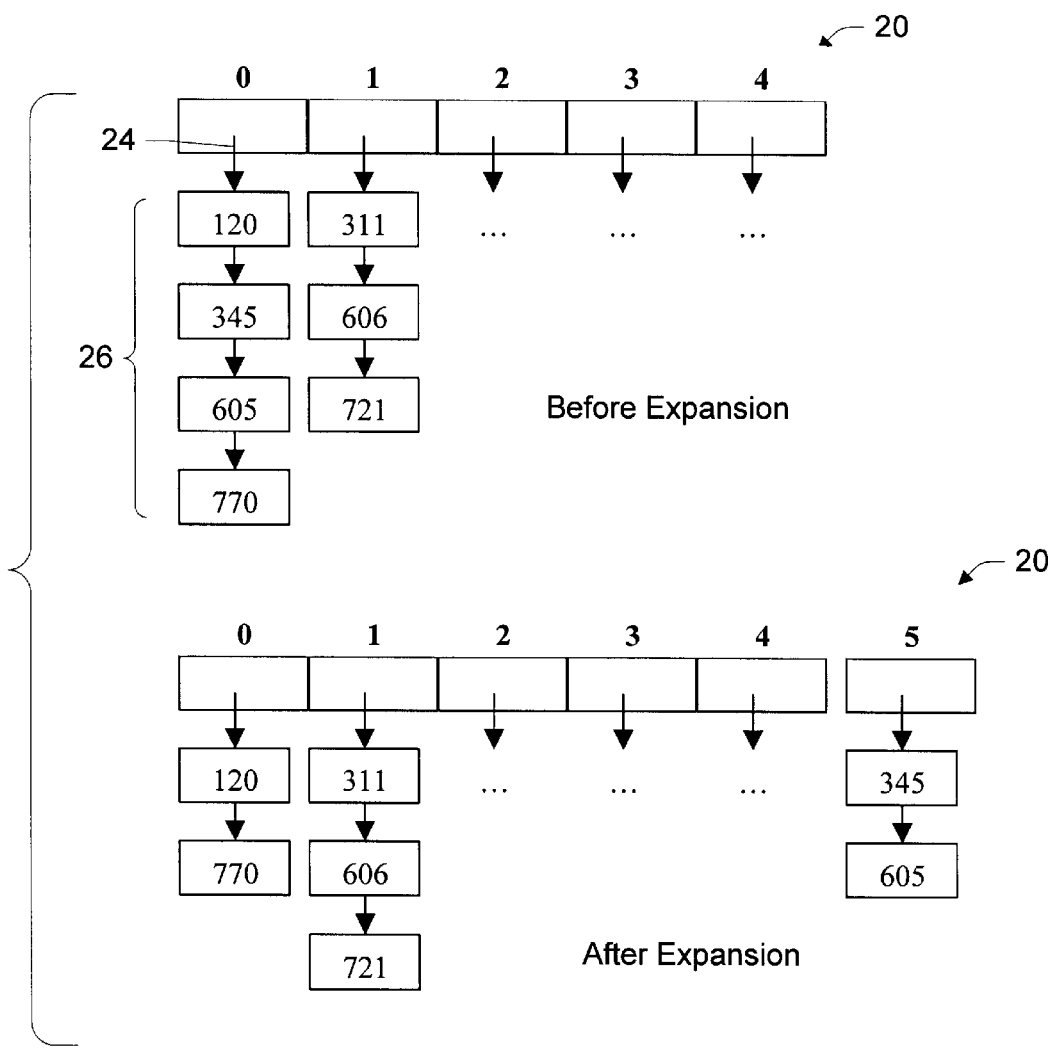
FIG. 2 is a diagrammatic illustration of the hash table and linked list of records referenced by buckets in the hash table.

Consider, for example, the conventional hash table data structure 20 shown in FIG. 2 and described in the Background section. Each entry in the hash table consists of nothing more than a pointer to a linked list containing all items hashing to that address. The linked list, or "hash chain", can either be embedded or separate. In the first case, the pointer field needed for the hash chain is embedded in the items themselves. In the second case, the hash chain consists of separate link nodes containing two fields: a pointer to the next link node and a pointer to the target item. The second alternative requires more space but has the advantage of being non-intrusive; that is, the target items are completely unchanged.

Unfortunately, this organization has poor processor cache behavior, that is, generates many cache misses during operation. To see why, consider the retrieval of an item that happens to be the fifth item on its hash chain and count the potential cache misses. First, take the case of embedded hash chains.

1. Get hash table parameters: one miss.
2. Get segment pointer from directory: one miss.
3. Get pointer to first item: one miss.
4. Repeat five times to get to fifth item:
   4.1. Get key of item: one miss (assuming the key is contained in one cache line).
   4.2. Get pointer to next item: one miss (assumed to be in a different cache line than the key).

The total is 13 potential cache misses. This assumes that locating the key and comparing it with the search key results in only one cache miss. If the key is long or not located at a fixed position within the item, the number of cache misses may be higher. When separate, non-intrusive link nodes are used, the total number of potential cache misses turns out to be the same. In practice, some parts of the hash table structure probably would remain in the cache, reducing the actual number of cache misses.

Note also that the various items read during retrieval may be scattered over multiple memory pages. In the worst case, we may touch as many as 13 different pages 72 stored in the memory subsystem 70, requiring up to 13 separate disk accesses.

Thirteen potential cache misses is far too high. Accordingly, another part of the current solution involves reducing the number of potential cache misses to improve overall performance.

Exemplary Hash Table Data Structure

The scaleable hash table 80 is implemented, for discussion purposes, as an expanding and contracting array formed as a two-level data structure. However, other data structures may be used to implement the scaleable hash table, so long as they support the processes described below to reduce cache misses and minimize lock contention.

Figure 4:
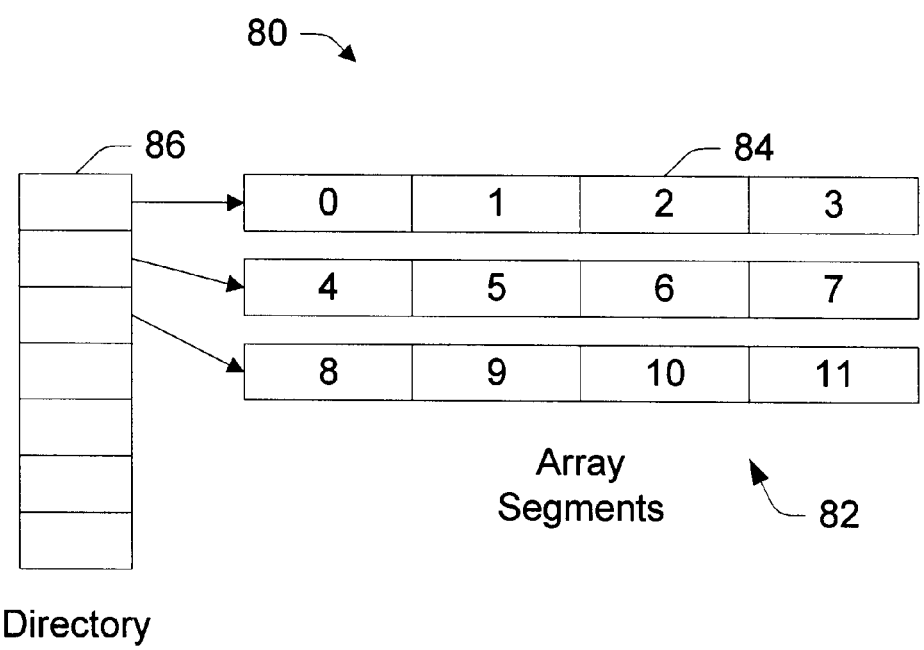
FIG. 4 is a diagrammatic illustration of a scaleable hash table implemented as an expanding and contracting array.

FIG. 4 shows the hash table 80 as an array 82 that is divided into segments 84 of fixed size. When the array grows, new segments 84 are allocated as needed. When the array shrinks and a segment becomes superfluous, it can be freed. A segment directory 86 tracks the start address of each segment in use.

It is most convenient to let one segment correspond to a minimum table size. If the segment size is a power of two, the offset within the directory and the offset within a segment can be computed from the bucket address by masking and shifting. A directory size and segment size of 256 gives a maximum address space of 64K buckets (i.e., 256×256).

One exemplary implementation of a hashing function is given below in C. If the keys are alphanumeric, the key value must first be converted into an integer. The function "convertkey ()" performs this conversion. The hashing function g discussed above is implemented as g(K)= (314159269×K) mod 1000000007.

```
int hash (keytype K, hashtable *T){
    unsigned int h, mask, address;
    h=(314159269*convertkey(K))% 1000000007;
    mask=(1<<(T→L+T→SegBits))−1;
    address=h & mask;/* H0(h)*/
    if (address<T→p)
address=h & ((mask<<1)|1); /* H1(h)*/
    return(address);
}
```

Cache and Memory Friendly Hashing

Figure 5:
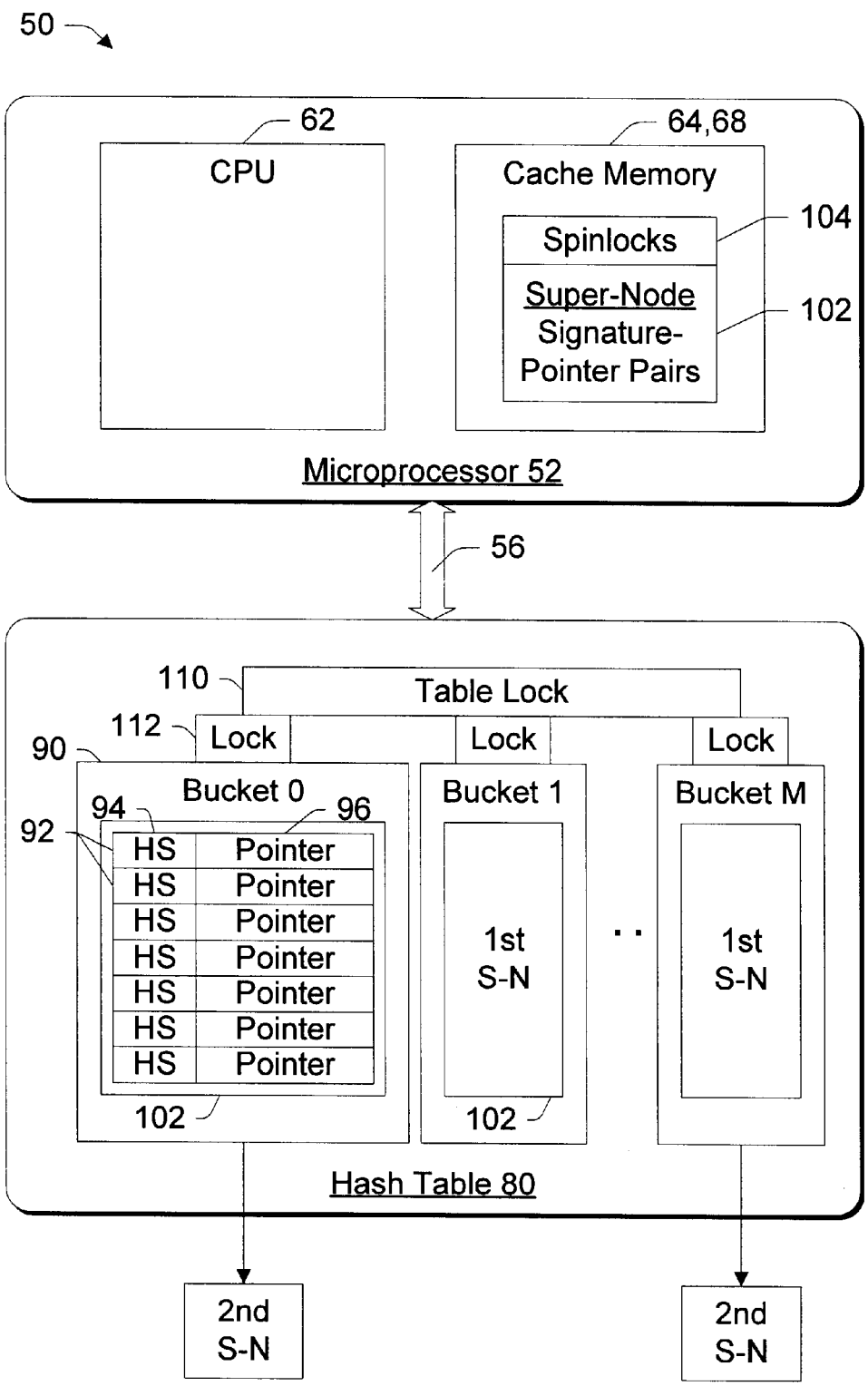
FIG. 5 is a block diagram of functional components in the SMP system to illustrate interaction between one of the microprocessors and the scaleable hash table.

FIG. 5 is a functional diagram showing the components of a scaleable hash table. The hash table 80 is configured to reduce cache misses through a combination of techniques: comparing hash signatures; combining nodes on hash chains into larger super nodes; and pulling the first super node of the linked hash chain into the hash table itself Additionally, the hash table 80 is configured to reduce lock contention through a combination of techniques: using lightweight spin locks for synchronization; locking buckets in addition to, or rather than, the whole table; and partitioning items among multiple subtables.

The hash table 80 is shown with M buckets 90. Since the table is scaleable, the number M varies as buckets are added or removed. Each bucket 90 contains a reference to a linked list of bucket nodes 92. Each bucket node 92 corresponds to an item of data.

Technique 1: Hash Signatures

Traditionally, each bucket consisted of a linked list of link nodes, where each link node points to a data item or record. Each record contains one or more fields that together constitute a unique key identifying the record. However, accessing and comparing whole keys may be computationally expensive. To avoid key comparisons, a first aspect of this invention is to include a signature in each link node, where the node signature is a 32-bit hash value computed from the key of the associated record.

Each link node 92 thus comprises a hash signature (HS) 94 and a pointer 96 to the data item. Accordingly, link node 92 can alternatively be referred to as a "signature-pointer pair".

During lookup, the lookup routine first computes a signature for the search key of the target data item. In one implementation, the hash function used is the function, convertkey. The lookup routine then compares the signature of the search key with the hash signatures 94 in the link nodes 92. This allows faster comparison than key value matching. If hash signatures do not match, the keys cannot match either. When two signatures match, the lookup routine performs a full key comparison to conclusively determine whether the two keys match.

A well-designed signature function produces very few signature clashes; i.e., different keys with the same signature value. If there are no clashes, a successful lookup requires only one key comparison, namely, the final comparison confirming that the search has indeed found the right item. An unsuccessful lookup will frequently require no key comparisons at all. In practice, a small number of clashes will occur, but not many.

Hash signatures eliminate potential cache misses and the same number of key comparisons. From the original example described above, which resulted in 13 cache misses, using hash signatures saves four cache misses.

Technique 2: Create Bucket "Super"-Nodes and Pack Them Into Cache Lines

One potential cache miss results from each signature-pointer pair 92 that is traversed during a search. To improve cache locality, the link nodes on a hash chain are replaced by "super"-nodes that contain multiple signature-pointer pairs, each pair associated with one record. This is represented in FIG. 5 by a super-node 102 that has seven signature-pointer pairs 92. These super-nodes 102 are laid out carefully to fit exactly into one or a few cache lines in cache memory 64, 68 in order to minimize the number of cache misses during search. The terms "super-node", "bucket node", or "bucket super-node" are used interchangeably throughout the disclosure to reference the same large size node 102 that holds multiple signature-pointer pairs 92.

Figure 6:
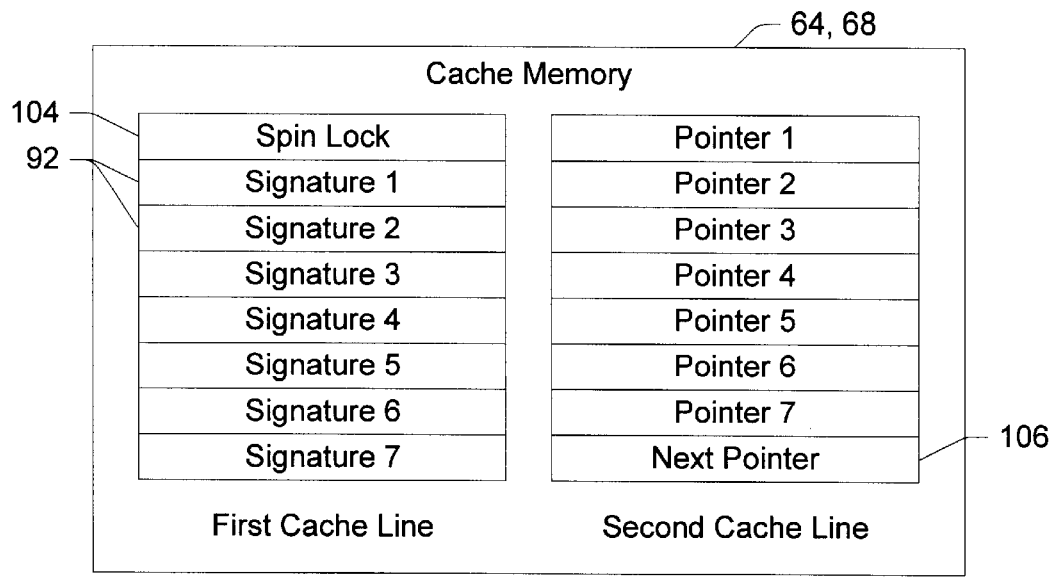
FIG. 6 is a diagrammatic illustration of a cache memory loaded with a large bucket node of multiple signature-pointer pairs.

FIG. 6 shows an exemplary layout of a super-node 102 designed to fit into two cache lines. Cache lines are assumed to be of size 32 bytes while all pointers and signatures occupy 4 bytes each. The spin lock 104 (to be discussed later) is also assumed to occupy 4 bytes. The figure shows seven pointer-signature pairs 92 placed into two cache lines. The pairs are organized so that the signatures are placed in the first cache lines, while the corresponding pointers are placed in the second cache lines. In this manner, the pointers into the second cache line will not be referenced if it is determined that none of the signatures in the first cache line match the hashed key value. This potentially saves one cache miss. A next pointer 106 is appended to the end of the second cache line to reference the next super-node in the linked list.

Creating super-nodes and laying them out to fit exactly into cache lines reduces the number of potential cache misses In the continuing example, this technique eliminates three more potential cache misses, thereby bringing the total from thirteen down to six (including the misses saved by using signatures).

One additional benefit arising from creating super-nodes is that fewer nodes are constructed. This results in less time spent on allocating and freeing memory. However, it is unclear whether more or less memory is used in total. Eliminating next pointers and reducing overhead (i.e., fewer nodes) and fragmentation saves memory, but some of the slots in the super-nodes may go unused.

Technique 3: Pull First Bucket Node Into Hash Table

The first bucket super-node 102 is itself stored in the hash table 80, rather than just a pointer to the first node. That is, in the illustrated implementation, all seven signature-pointer pairs 92 that make up the bucket node 102 are kept in the hash table 80. Moving the first super-node into the hash table reduces the potential cache misses by one. It also offers additional benefits in terms of spending less time on memory management and reducing the application's working set.

Assume that each super-node contains seven slots for seven signature-pointer pairs and the average linked list length is limited to five. A great majority of hash table entries will receive seven items or less. These will all fit into the first super-node 102, which is stored in the hash table 80, and no additional nodes need be allocated. Furthermore, space for the first super-node is allocated automatically when the corresponding array segment is allocated. Very little time is spent on memory allocation, but some space is wasted because it is preallocated in larger chunks.

Next, consider working set size. Consider a hash table consisting of 500 entries, storing 2500 items, and assume that the page size is 4K bytes. In conventional designs, the hash table data structure may be spread over as many as 2502 pages; that is, one for the "root" of the hash table, one for the 500 pointers, and one each for the 2500 link nodes. By using larger bucket super-nodes capable of holding seven pointer-signature pairs, this is reduced to 502 pages or slightly more. One for the "root" of the hash table, one for the 500 pointers, and one node for each of the 500 addresses (a small fraction will have more than one node).

By pulling the first super-node into the hash table, this is reduced to eight pages (500×64/4096) plus one for each overflow link node. This is a worst-case analysis, so in practice the reduction will not be as dramatic, but still very significant.

Technique 4: Lightweight Spinlocks

As noted earlier, carefully crafted spinlocks 104 are employed for synchronization. In one exemplary implementation, each spinlock occupies four bytes and includes two fields: a count and a thread ID field.

The ID of the thread holding the lock is stored to make it possible for the same thread to reacquire the lock without deadlocking itself. The count is included to allow a thread to acquire the same lock recursively (a limited number of times) without deadlocking itself. When a thread tries to acquire a lock and it is already locked by another thread, the thread spins in a tight loop testing the lock repeatedly. In one implementation, bounded spinlocks are used. Bounded spinlocks limit the number of times a thread tests a lock before it sleeps and relinquishes the processor. A default bound is 4000 times.

Spinlocks use less memory than most other synchronization mechanisms and in particular, much less than Windows critical sections. As a result, more locks can be employed to protect smaller parts of a data structure. Spinlocks greatly reduce the frequency of context switches, but only if locks are held for a very short time. Spinlocks are best thought of as cheap, short-duration locks.

Technique 5: Dual Table and Bucket Locks

The hash table 80 uses two levels of locks: a table lock 110 and a bucket lock 112 for each bucket. The locks are implemented as spin locks. The table lock 110 protects access to table-wide data like the split pointerp, various counters, and the directory of segments. The lower level bucket lock 112 serializes all operations on items in a particular bucket. The two-tiered lock mechanism provides fine-granularity locking and greatly reduces lock contention.

All operations on the table 80 first acquire the table lock 110. Once the process is inside the table and has selected a bucket 90, the process locks the bucket lock 112 for that bucket then releases the table lock 110 to other threads. The table lock 110 is held just long enough to find and lock the bucket lock 112 of the target bucket 90. Holding the table lock while finding and locking the bucket lock 112 prevents race conditions such as a concurrent expansion that changes the values used in the $h_0$ and $h_1$ functions.

Bucket locks 112 allow the table lock 110 to be released much sooner, thereby enabling another thread to concurrently access the table. Minimizing the hold time of the table lock reduces contention and improves concurrency considerably. Since there are typically several hundred buckets in a hash table, contention on the bucket locks 112 is negligible.

Technique 6: Table Partitioning

Another technique that may be employed by the scaleable hashing system is to use a hash table 80 that is partitioned into multiple separate subtables, where each subtable is a linear hash table.

Figure 7:
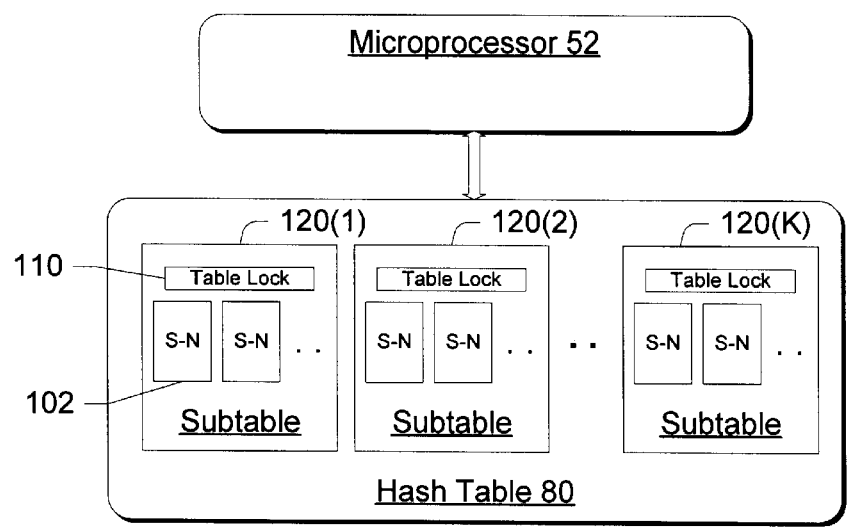
FIG. 7 is a block diagram similar to FIG. 5, but shows the hash table partitioned into multiple subtables.

FIG. 7 shows a hash table 80 partitioned into multiple subtables 120(1), 120(2), . . . 120(K). Each subtable 120 contains a set of buckets, and each bucket holds its first bucket super-node (S-N) 102 for the linked list of nodes. Items are assigned to various subtables by hashing on the key value. Each subtable receives a much lower rate of operations, resulting in fewer conflicts.

The number of subtables 120 is determined when the hash table 80 is created. It cannot be changed at run time. The subtables, including their directories, are also allocated at creation time. By disallowing changes in the number of subtables at run time, additional levels of locks can be avoided.

Other Improvements

In addition to the six techniques outlined above, several improvements to conventional insert, delete, and lookup algorithms may be used to reduce lock hold time. These improvements include:
1. The primary hash function is computed before the table lock 110 is acquired. The primary hash of the key is deterministic and has no dependency upon the state of the hash table (nor vice versa).
2. Tests to determine whether to expand or contract the hash table 80 are made without locking. Linear hashing promises to keep the overall load factor bounded. Locking the table to test whether to expand provides no useful extra accuracy and only increases contention.
3. The table lock 110 is released early when expanding (contracting) the table 80. The table lock is held while finding and locking the old and new buckets (and possibly expanding (shrinking) the directory of segments), but it is not necessary to hold it while splitting (merging) the two bucket chains.

Experimental Results

Several tests were conducted using aspects implemented in the SMP system 50 described herein. Various aspects were implemented and tested first in a single processor construction, and then in a multiprocessor construction. The tests and results are described below.
Single Processor Tests This section presents results from various tests conducted by the inventors on systems that implement one or more techniques described above. The first results demonstrate the performance benefits of using signatures and creating large super-nodes. The basic input consists of a 25,084-entry dictionary of English words. To create any number of distinct keys, the original 25,084 entries are replicated prefixed with a digit; e.g., "abba", "0abba", "1abba", "2abba". In the experiments, the key set was expanded to 100,000 or 200,000 keys. Performance was measured as throughput; that is, the number of insertion, deletion, and search operations per second. The experiments were run on a 300 MHz Pentium II machine with one processor.

Hardware counters available on the Pentium-brand processor were used to measure the number of clock cycles, the number of instructions executed, and the number of L1 and L2 cache misses per operation. Each experiment consisted of three phases: (1) build a hash table by inserting 200,000 keys, (2) perform 1,000,000 random (successful) lookups and (3) empty the hash table by deleting the 200,000 keys.

Figure 8:
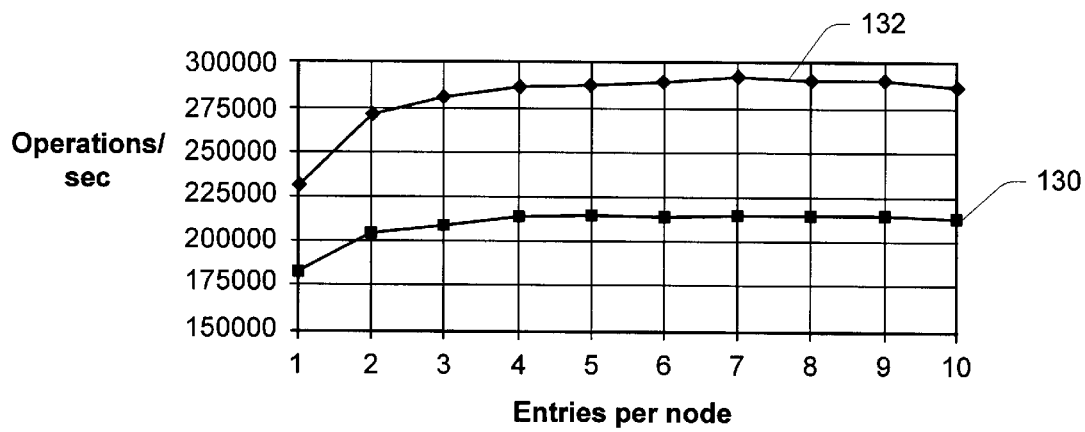
FIG. 8 is a graph plotting the number of signature-pointer pairs in a bucket node in terms of operation speed measured in operations per second.

FIG. 8 shows the effect of changing the node size (i.e., how many pointer-signature pairs are packed into a link node) and of using hash signatures. The hash table used a single subtable and the load factor limit was set to 5.0. The input consisted of 200,000 keys and five random lookups were performed for each insert or delete operation. The experiment was repeated 5 times so that each point in the diagram is based on one million inserts, one million deletes and ten million lookups.

A lower curve 130 represents the process where hash signatures are not used, and individual keys are compared. An upper curve 132 represents the process where hash signatures are used.

The "1" entry/node case corresponds to a traditional (non-embedded) linked list wherein each node only contains one pointer, or signature-pointer pair. It was found that increasing the node size by grouping multiple pointers or signature-pointer pairs improves performance up to four pairs/node, but makes little difference thereafter.

It was also found that using signatures increases throughput significantly. The combined effect is an increase of 60%, from 182,423 operations/sec for a node of size one (i.e., one signature-pointer pair per node) and no signatures to 292, 127 operations per second for a node of size seven with signatures. Hash signatures save cache misses and key comparisons. In this example, the keys are case-sensitive strings, so key comparisons are inexpensive. One can expect even greater benefits for cases where key comparisons are more expensive.

The increased throughput is a result of fewer cache misses and executing fewer instructions. The techniques were observed to speed up insertions and deletions more than lookups. For a load factor of 5.0, insert time is reduced by 54%, delete time by 43%, but lookup time only by 33%.

Table 1 shows the results for load factors of 5.0 and 10.0 in terms of insert, lookup, and delete operations. Even though the reductions in L1 and L2 cache misses are impressive, it appears that the savings in instructions executed has more effect on run time. Fewer cache misses does not affect the number of instructions executed, but it reduces processor stalls, thereby reducing the average number of cycles per instruction. For lookups with a load factor of 5.0, the total reduction is 517 cycles. Of this, about 237 cycles can be attributed to fewer cache misses (35 L1 cycles and 202 L2 cycles) and the remaining 280 to fewer instructions. For inserts, the corresponding number is 1249 cycles, of which about 531 can be attributed to fewer cache misses (75 L1 cycles and 456 L2 cycles) and the remaining 793 to fewer instructions. This analysis is only approximate. Pentium processors execute instructions out of order which makes an exact analysis difficult.

It was also observed that hash table throughput and space per record used by the hash table depend on the node size and the load factor. The optimum number of signature-pointer pairs that are grouped into a bucket node are three (32 bytes, one cache line) and seven (64 bytes, two cache lines).

TABLE 1

| Instructions, Cycles and Cache misses per Operation | | | | | | | | |
|---|---|---|---|---|---|---|---|---|
| | Load factor 5.0 | | | | Load factor 10.0 | | | |
| Entries/node | 1 | 1 | 7 | 7 | 1 | 1 | 7 | 7 |
| Signatures | No | Yes | No | Yes | No | Yes | No | Yes |
| Inserts | | | | | | | | |
| Instructions | 958 | 900 | 602 | 545 | 1085 | 967 | 736 | 624 |
| Cycles | 2316 | 1629 | 1800 | 1067 | 3325 | 1961 | 2547 | 1152 |
| Cycles/ instruction | 2.42 | 1.81 | 2.99 | 1.96 | 3.06 | 2.03 | 3.46 | 1.85 |

TABLE 1-continued

Instructions, Cycles and Cache misses per Operation

|  | Load factor 5.0 | | | | Load factor 10.0 | | | |
|---|---|---|---|---|---|---|---|---|
| Entries/node | 1 | 1 | 7 | 7 | 1 | 1 | 7 | 7 |
| Signatures | No | Yes | No | Yes | No | Yes | No | Yes |
| L1 cache misses | 22.56 | 13.63 | 16.07 | 7.73 | 36.17 | 18.81 | 24.83 | 9.42 |
| L2 cache misses | 13.07 | 7.14 | 9.84 | 3.95 | 23.01 | 10.99 | 15.89 | 5.09 |
| Lookups | | | | | | | | |
| Instructions | 362 | 348 | 342 | 328 | 420 | 389 | 382 | 351 |
| Cycles | 1561 | 1236 | 1389 | 1044 | 2140 | 1490 | 1762 | 1095 |
| Cycles/instruction | 4.1 | 3.55 | 4.06 | 3.18 | 5.10 | 3.83 | 4.61 | 3.12 |
| L1 cache misses | 14.93 | 10.36 | 12.06 | 7.92 | 22.72 | 13.54 | 16.46 | 8.41 |
| L2 cache misses | 9.20 | 6.46 | 7.85 | 5.15 | 14.28 | 8.76 | 11.05 | 5.66 |
| Deletes | | | | | | | | |
| Instructions | 740 | 718 | 513 | 493 | 718 | 678 | 589 | 542 |
| Cycles | 2099 | 1821 | 1459 | 1199 | 2339 | 1867 | 1883 | 1292 |
| Cycles/instruction | 2.84 | 2.54 | 2.84 | 2.43 | 3.26 | 2.75 | 3.20 | 2.38 |
| L1 cache misses | 20.51 | 17.14 | 10.59 | 7.39 | 25.19 | 19.41 | 16.46 | 9.37 |
| L2 cache misses | 11.84 | 9.67 | 6.52 | 4.46 | 14.66 | 11.04 | 10.08 | 5.25 |

Figure 9:
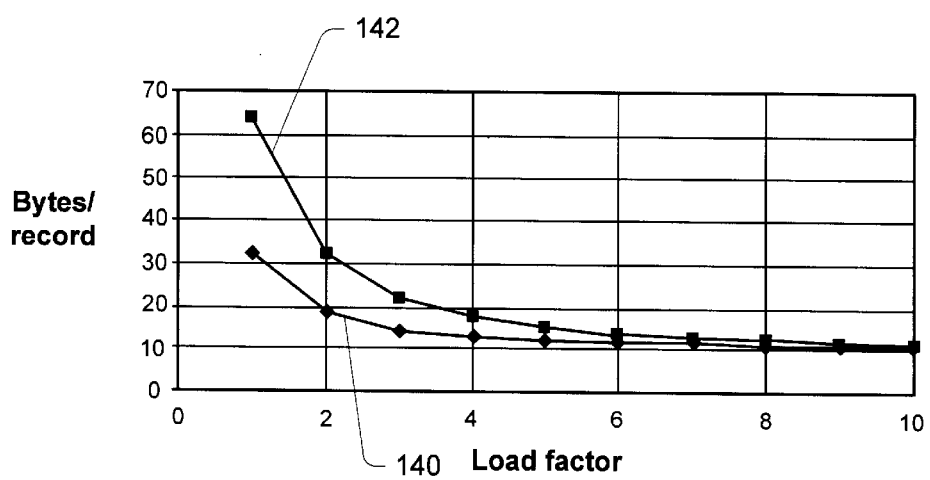
FIG. 9 is a graph plotting space per record as a function of the load factor for two different node sizes (i.e., three and seven signature-pointer pairs).

FIG. 9 shows a diagram plotting space per record as a function of the load factor for these two node sizes. Lower curve 140 represents the case for a node having three signature-pointer pairs and upper curve 142 represents the case for a node having seven signature-pointer pairs. The data is for a table of 200,000 records.

For a load factor of 1.0, slightly over one node (32 bytes or 64 bytes) is needed per record. Space used per record tapers off quickly as the load factor increases. For a load factor of 4.0, it is already down to 13.0 and 17.4 bytes and for a load factor of 6.0, it is 11.6 and 13.3 bytes.

Figure 10:
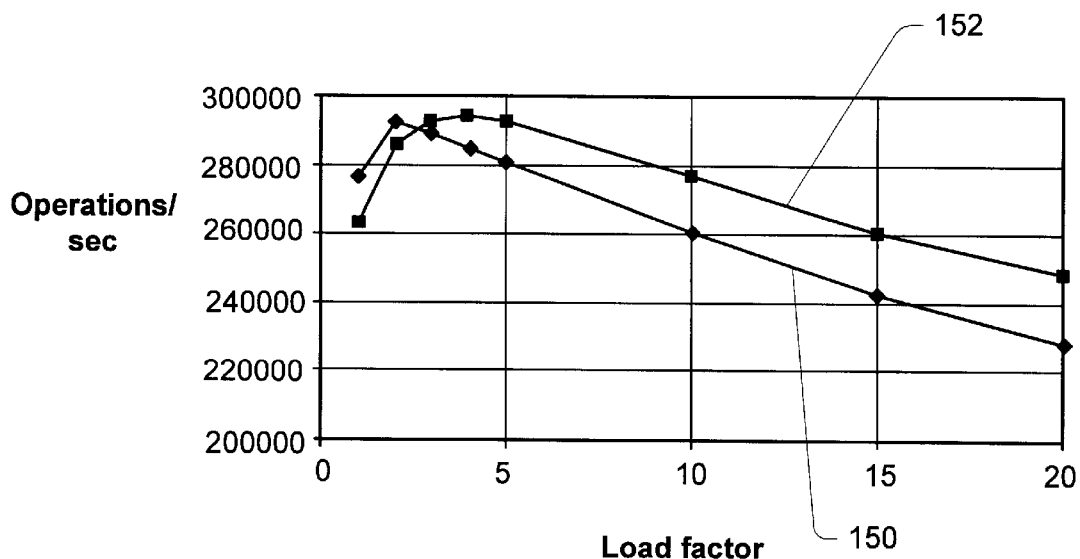
FIG. 10 is a graph plotting throughput in operations per second for two node sizes (i.e., three and seven signature-pointer pairs).

FIG. 10 shows a diagram plotting the throughput in operations per second as a function of load factor. Curve 150 represents the case for node size 3 (i.e., three pairs per node) and curve 152 represents the case for node size 7 (i.e., seven pairs per node). Once again, the data is for a table of 200,000 records.

Throughput is fairly stable over a wide load factor range, varying between 260,000 and 300,000 operations per second for a load factor between 1.0 and about 10. The best performance is achieved with a moderate load factor, somewhere between 2 and 6. For node size 3, the maximum is 292,127 operations/sec at a load factor of 3 and for node size 7 the maximum is slightly higher at 294,139 operations/sec at a load factor of 4. For both node sizes, a load factor around 5 is a good compromise, combining high throughput with good storage utilization.

Multiprocessor Tests

The following experiments examined the scalability of the techniques utilized in the SMP system 50. The tests were run on an 8-way multiprocessor system with 200 MHz Pentium Pro processors, each with 512 KB L2 cache. In an ideal situation, throughput should increase linearly with the number of threads concurrently accessing the hash table. Perfect (linear) increase in throughput cannot be achieved in practice because of resource contention, both in software (locks held) and in hardware (system bus and memory).

The following test was repeated for T threads, where T runs from 1 to 20. The input consists of a 100,000-element array of keys, partitioned into 100,000/T subarrays, one for each of the T threads. Each thread adds one element to the shared hash table at a time. As each entry is added, each thread makes S searches for words that it has already added to the hash table, each target word being, chosen at random. Once all 100,000 words have been added to the hash table, the table is torn down, one element at a time. As each element is deleted, another S random searches are made for words known to still be in the hash table. Each of the T threads does R rounds of insertions, deletions, and 2S searches. When the R rounds have completed, the entire set of operations begins again for T+1 threads. In the results presented in FIGS. 11 and 12, each insertion, deletion, and search is counted as a separate operation.

One metric of interest is throughput: the number of insertion, deletion, and search operations per second. Also of interest in scalability: the number of operations/second for T threads compared to the number of operations/second for one thread. Ideally, we would achieve linear scalability.

Figure 11:
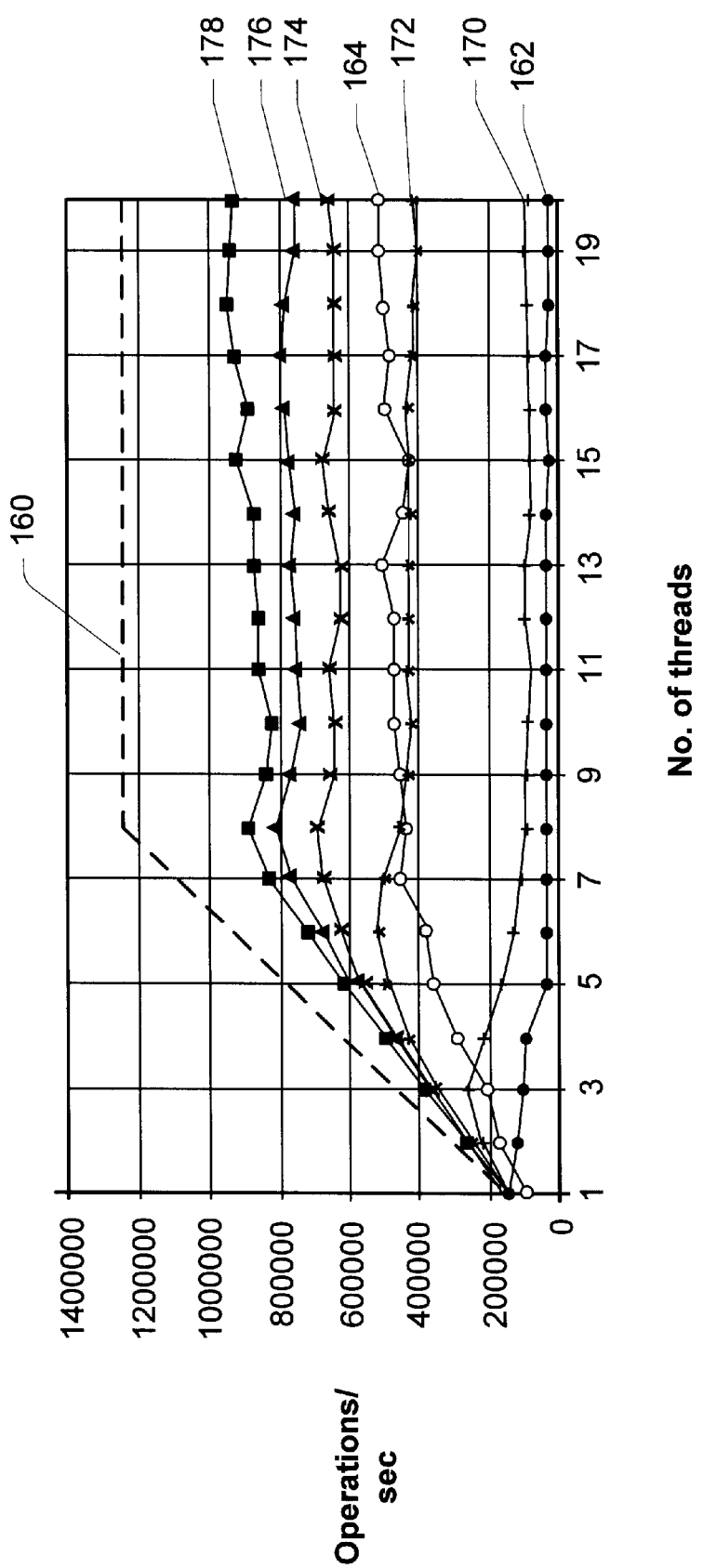
FIG. 11 is a graph showing scalability of the SMP system as more threads are utilized.

FIG. 11 shows the scalability as the number of threads T is increased for seven different configurations. Curves 162, and 164 represent benchmarks using conventional scaleable hashing. The dashed curve 160 represents an ideal-case linear speed up with perfect scalability. The lowest curve 162 represents conventional linear hashing that uses a single table with a single global lock. Notice that gating all operations through a global lock harms scalability. The more threads, the worse the throughput. Curve 164 represents a fixed size hash table with one lock per bucket. It performs better than the global lock arrangement.

Curves 170, 172, 174, 176, and 178 represent various implementations of the scaleable hash table described herein, with different numbers of subtables ranging from 1 to 32. Curve 170 represents a single hash table (i.e., no partitioned subtables) that utilizes a table lock and bucket locks. This results in only slight improvement over the conventional global table lock case as represented by curve 162. Curve 172 represents a scaleable hash table with four partitioned subtables. Curve 174 represents a scaleable hash table with eight partitioned subtables. Curve 176 represents a scaleable bash table with sixteen partitioned subtables. Curve 178 represents a scaleable hash table with thirty-two partitioned subtables. In each case, two levels of locks were used.

From the plotted results, it is clear that partitioning locks helps scalability. The higher the number of subtables, the better the throughput as threads are added. Having only one subtable (curve 170) becomes quite a bottleneck, as all operations contend for the single tablelock. Multiplexing operations across even four tables improves throughput. In practice, one subtable per CPU gives good results. Adding more than that yields little benefit, since most applications also do work other than updating hash tables.

The hash table thus scales extremely well, achieving throughput rates of over 75% of the ideal rate. This is highly unusual on an 8-way system.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A system, comprising:

a memory subsystem to store data items;

a hash table stored in the memory subsystem to facilitate access to the data, the hash table comprising multiple buckets, each bucket containing a reference to a linked list of bucket nodes that hold references to data items with keys that hash to said each bucket, individual bucket nodes containing multiple signature-pointer pairs with each signature-pointer pair comprising a hash signature computed from a key of a data item and a pointer to the data item; and a processing subsystem coupled to the memory subsystem to access the data via the hash table, the processing subsystem comparing a hash signature of a search key for a target data item with the hash signatures of the signature-pointer pairs from the bucket nodes when searching a hash chain for the target data item.

2. A system as recited in claim 1, wherein the processing subsystem comprises multiple processors.

3. A system as recited in claim 1, wherein the hash table stores first bucket nodes of the linked lists referenced by the buckets.

4. A system as recited in claim 1, wherein the processing subsystem supports multiple processing threads that utilize the hash table to access particular data items in the memory subsystem, further comprising:

a table lock to selectively allow access by a single processing thread to the hash table while blocking access for other processing threads; and multiple bucket locks for corresponding buckets, each bucket lock selectively allowing access by a single processing thread to the corresponding bucket while blocking access for other processing threads.

5. A system as recited in claim 1, wherein the hash table is partitioned into multiple subtables, with each subtable having multiple buckets.

6. A system as recited in claim 1, wherein said individual bucket nodes contain three signature-pointer pairs.

7. A system as recited in claim 1, wherein said individual bucket nodes contain seven signature-pointer pairs.

8. A shared-memory multiprocessor system, comprising:

a memory subsystem to store data items;

a hash table stored in the memory subsystem to facilitate access to the data, the hash table being partitioned into multiple subtables, each subtable comprising multiple buckets, each bucket containing a reference to a linked list of bucket nodes that hold references to data items with keys that hash to said each bucket, individual bucket nodes containing multiple signature-pointer pairs, each signature-pointer pair comprising a hash signature computed from a key of a data item and a pointer to the data item;

the hash table being configured to store first bucket nodes of the linked lists referenced by the buckets;

multiple processors coupled to the memory subsystem, each processor supporting at least one processing thread that uses the hash table to access particular data items in the memory subsystem;

multiple subtable locks for corresponding ones of the subtables, each subtable lock selectively allowing access by a single processing thread to the corresponding subtable while blocking access for other processing threads; and multiple bucket locks for corresponding buckets, each bucket lock selectively allowing access by a single processing thread to the corresponding bucket while blocking access for other processing threads.

9. A shared-memory multiprocessor system as recited in claim 8, wherein said each processor hashes a key of a target data item and compares the hashed key with the hash signatures of the signature-pointer pairs from the bucket nodes in an effort to locate the target data item.

10. A shared-memory multiprocessor system as recited in claim 8, wherein said each processor has a cache memory and one of said processors loads the multiple signature-pointer pairs from one of the bucket nodes into the cache memory.

11. A shared-memory multiprocessor system as recited in claim 10, wherein the cache memory has at least two cache lines and the signature-pointer pairs are arranged in the cache memory so that the hash signatures are placed in a first of the cache lines and the pointers are placed in a second of the cache lines.

12. A shared-memory multiprocessor system as recited in claim 10, wherein said one processor sets a lock on the cache memory.

13. A system, comprising:

a memory subsystem to store data items;

a hash table stored in the memory subsystem to facilitate access to the data, the hash table comprising multiple buckets, each bucket containing a reference to a linked list of bucket nodes that hold references to data items with keys that hash to said each bucket;

individual bucket nodes containing multiple signature-pointer pairs, each signature-pointer pair comprising a hash signature computed from a key of a data item and a pointer to the data item;

a processing subsystem coupled to the memory subsystem, the processing subsystem supporting multiple processing threads that utilize the hash table to access particular data items in the memory subsystem;

a table lock to selectively allow access by a single processing thread to the hash table while blocking access for other processing threads; and multiple bucket locks for corresponding buckets, each bucket lock selectively allowing access by a single processing thread to the corresponding bucket while blocking access for other processing threads.

14. A system as recited in claim 13, wherein the processing subsystem comprises multiple processors.

15. A system as recited in claim 13, wherein the hash table stores first bucket nodes of the linked lists referenced by the buckets.

16. A system as recited in claim 13, wherein the hash table is partitioned into multiple subtables; with each subtable having multiple buckets.

17. A system as recited in claim 13, wherein the processing subsystem has a cache memory and loads the multiple signature-pointer pairs from one of the bucket nodes into the cache memory.

18. A system as recited in claim 17, wherein the cache memory has at least two cache lines and the signature-pointer pairs are arranged such that the hash signatures are placed in the first of the cache lines and the pointers are placed in the second cache lines.

19. A system as recited in claim 17, wherein the processing subsystem sets a spin lock on the cache memory.

20. A system, comprising:

a memory subsystem to store data items;

a hash table stored in the memory subsystem to facilitate access to the data, the hash table comprising multiple buckets, each bucket containing a reference to a linked list of bucket nodes that hold references to data items with keys that hash to said each bucket, individual bucket nodes containing a signature-pointer pair having a hash signature computed from a key of a data item and a pointer to the data item;

the hash table being configured to store first bucket nodes of the linked lists referenced by the buckets; and a processing subsystem coupled to the memory subsystem to access the data via the hash table, the processing subsystem comparing a hash signature of a search key of a target data item with the hash signatures of the signature-pointer pairs from the bucket nodes in an effort to locate the target data item.

21. A system as recited in claim 20, wherein the individual bucket nodes contain multiple signature-pointer pairs.

22. A system as recited in claim 20, wherein the processing subsystem comprises multiple processors.

23. A system as recited in claim 20, wherein the processing subsystem supports multiple processing threads that utilize the hash table to access particular data items in the memory subsystem, further comprising:

a table lock to selectively allow access by a single processing thread to the hash table while blocking access for other processing threads; and multiple bucket locks for corresponding buckets, each bucket lock selectively allowing access by a single processing thread to the corresponding bucket while blocking access for other processing threads.

24. A system as recited in claim 20, wherein the hash table is partitioned into multiple subtables, with each subtable having multiple buckets.

25. A system as recited in claim 20, wherein the processing subsystem has a cache memory and loads the signature-pointer pair from a first bucket node in the hash table into the cache memory.

26. A system, comprising:

a memory subsystem to store data items;

a hash table stored in the memory subsystem to facilitate access to the data, the hash table comprising multiple buckets, each bucket containing a reference to a linked list of bucket nodes that hold references to data items with keys that hash to said each bucket, individual bucket nodes containing multiple pointers to associated data items;

the hash table being configured to store first bucket nodes of the linked lists referenced by the buckets; and a processing subsystem coupled to the memory subsystem to access target data items by traversing the bucket nodes referenced in the hash table.

27. A system as recited in claim 26, further including multiple hash signatures respectively associated with the multiple pointers, to form multiple signature-pointer pairs.

28. A system as recited in claim 26, wherein the processing subsystem comprises multiple processors.

29. A system as recited in claim 26, wherein the processing subsystem supports multiple processing threads that utilize the hash table to access particular data items in the memory subsystem, further comprising:

a table lock to selectively allow access by a single processing thread to the hash table while blocking access for other processing threads; and multiple bucket locks for corresponding buckets, each bucket lock selectively allowing access by a single processing thread to the corresponding bucket while blocking access for other processing threads.

30. A system as recited in claim 26, wherein the hash table is partitioned into multiple subtables, with each subtable having multiple buckets.

31. A system as recited in claim 27, wherein the processing subsystem has a cache memory and loads the multiple signature-pointer pairs from one of the bucket nodes into the cache memory.

32. A system as recited in claim 31, wherein the cache memory has at least two cache lines and the signature-pointer pairs are arranged in the cache memory so that the hash signatures are placed in a first of the cache lines and the pointers are placed in a second of the cache lines.

33. A system as recited in claim 31, wherein the processing subsystem sets a spin lock on the cache memory.

34. A system, comprising:

a memory subsystem to store data items;

a hash table stored in the memory subsystem to facilitate access to the data, the hash table comprising multiple buckets, each bucket containing a reference to a linked list of bucket nodes that hold references to data items with keys that hash to said each bucket;

individual bucket nodes containing multiple signature-pointer pairs, each signature-pointer pair comprising a hash signature computed from a key of a data item and a pointer to the data item;

the hash table being configured to store first bucket nodes of the linked lists referenced by the buckets; and a processing subsystem coupled to the memory subsystem to access a target data item by comparing a hash of a key for the target data item with the hash signatures in the bucket nodes.

35. A system as recited in claim 34, wherein the hash table is partitioned into multiple subtables, with each subtable having multiple buckets.

36. A system as recited in claim 34, wherein the processing subsystem has a cache memory and loads the multiple signature-pointer pairs from one of the bucket nodes into the cache memory.

37. A system as recited in claim 36, wherein the cache memory has at least two cache lines and the signature-pointer pairs are arranged in the cache memory so that the hash signatures are placed in a first of the cache lines and the pointers are placed in a second of the cache lines.

38. A system as recited in claim 36, wherein the processing subsystem sets a spin lock that resides in the cache.

39. A system, comprising:

a memory subsystem to store data items;

a hash table stored in the memory subsystem to facilitate access to the data, the hash table comprising multiple buckets, each bucket containing a reference to a linked list of bucket nodes that hold references to data items with keys that hash to said each bucket, individual bucket nodes containing a signature-pointer pair comprising a hash signature computed from a key of a data item and a pointer to the data item;

a processing subsystem coupled to the memory subsystem, the processing subsystem supporting multiple processing threads that utilize the hash table to access particular data items in the memory subsystem;

wherein the hash table is partitioned into multiple subtables, and each subtable includes a subtable lock to selectively allow access by a single processing thread to the corresponding subtable while blocking access for other processing threads; and multiple bucket locks for corresponding buckets, each bucket lock selectively allowing access by a single processing thread to the corresponding bucket while blocking access for other processing threads.

40. A system as recited in claim 39, wherein the processing subsystem has a cache memory and loads the signature-pointer pair from one of the bucket nodes into the cache memory.

41. A system as recited in claim 40, wherein the individual bucket nodes contain multiple signature-pointer pairs, further wherein the cache memory has at least two cache lines and the signature-pointer pairs are arranged in the cache memory so that the hash signatures are placed in a first of the cache lines and the pointers are placed in a second of the cache lines.

42. A system as recited in claim 40, wherein the processing subsystem sets a spin lock that resides in the cache memory.

43. A system, comprising:
 a memory subsystem to store data items;
 a hash table stored in the memory subsystem to facilitate access to the data, the hash table being partitioned into multiple subtables, each subtable comprising multiple buckets, each bucket containing a reference to a linked list of bucket nodes that hold references to data items with keys that hash to said each bucket;
 a processing subsystem coupled to the memory subsystem, the processing subsystem supporting multiple processing threads that utilize the hash table to access particular data items in the memory subsystem;
 multiple subtable locks for corresponding ones of the subtables, each subtable lock selectively allowing access by a single processing thread to the corresponding subtable while blocking access for other processing threads; and
 multiple bucket locks for corresponding buckets, each bucket lock selectively allowing access by a single processing thread to the corresponding bucket while blocking access for other processing threads.

44. A system as recited in claim 43, wherein the hash table stores first bucket nodes of the linked lists referenced by the buckets.

45. A system as recited in claim 43, wherein the processing subsystem has a cache memory to temporarily hold bucket nodes for processing, the processing subsystem setting a spin lock on the cache memory.

46. A system, comprising:
 a memory subsystem to store data items;
 a hash table stored in the memory subsystem to facilitate access to the data, the hash table being partitioned into multiple subtables, each subtable comprising multiple buckets, each bucket containing a reference to a linked list of bucket nodes that hold references to data items with keys that hash to said each bucket;
 individual bucket nodes containing at least one signature-pointer pair comprising a hash signature computed from a key of a data item and a pointer to the data item; and
 a processing subsystem coupled to the memory subsystem to access the data via the hash table.

47. A system as recited in claim 46, wherein the processing subsystem has a cache memory to temporarily hold bucket nodes for processing, the processing subsystem setting a spin lock on the cache memory.

48. In a system having a memory subsystem and a processing subsystem that accesses the memory subsystem using a hash table, wherein the hash table comprises multiple buckets with each bucket containing a reference to a linked list of bucket nodes that hold references to data items with keys that hash to said each bucket, a method comprising:
 grouping multiple signature-pointer pairs into a single bucket node, each signature-pointer pair comprising a hash signature computed from a key of a data item and a pointer to the data item;
 loading a single bucket node of said multiple signature-pointer pairs into a cache memory;
 hashing a key of a target data item; and
 comparing the hashed key with the hash signatures of the signature-pointer pairs in the cache memory.

49. A method as recited in claim 48, wherein the grouping comprises grouping three signature-pointer pairs into the bucket node.

50. A method as recited in claim 48, wherein the grouping comprises grouping seven signature-pointer pairs into the bucket node.

51. A method as recited in claim 48, further comprising storing, in the hash table, a first bucket node from each of the linked lists of bucket nodes.

52. A method as recited in claim 48, further comprising:
 selectively setting a table lock to govern access to the hash table; and
 selectively setting one of multiple bucket locks to govern access to corresponding buckets.

53. A method as recited in claim 48, further comprising partitioning the hash table into multiple subtables.

54. A method as recited in claim 48, wherein the cache memory has at least two cache lines, and further comprising arranging the signature-pointer pairs in the cache memory so that the hash signatures are placed in a first of the cache lines and the pointers are placed in a second of the cache lines.

55. A method as recited in claim 54, further comprising setting a spin lock on the cache memory.

56. In a system having a memory subsystem and a processing subsystem that accesses the memory subsystem using a hash table, wherein the hash table comprises multiple buckets with each bucket containing a reference to a linked list of bucket nodes that hold references to data items with keys that hash to said each bucket, a method comprising:
 grouping multiple signature-pointer pairs in a single bucket node, each signature-pointer pair comprising- a hash signature computed from a key of a data item and a pointer to the data item;
 storing, in the hash table, a first bucket node from each of the linked lists of bucket nodes;
 establishing a table lock to selectively allow access to the hash table; and
 establishing multiple bucket locks for corresponding ones of the buckets to selectively allow access to the corresponding buckets.

57. A method as recited in claim 56, wherein the grouping comprises grouping three signature-pointer pairs into the bucket node.

58. A method as recited in claim 56, wherein the grouping comprises grouping seven signature-pointer pairs into the bucket node.

59. In a system having a memory subsystem and a processing subsystem that accesses the memory subsystem using a hash table, wherein the hash table comprises multiple buckets with each bucket containing a reference to a linked list of bucket nodes that hold references to data items with keys that hash to said each bucket, a method comprising:

grouping multiple signature-pointer pairs into a single bucket node, each signature-pointer pair comprising a hash signature computed from a key of a data item and a pointer to the data item;

storing a first bucket node from each of the linked lists of bucket nodes in the hash table;

partitioning the hash table into multiple subtables;

establishing subtable locks to selectively allow access of one processing thread at a time to the corresponding subtables;

establishing multiple bucket locks for corresponding ones of the buckets to selectively allow access of one processing thread at a time to the corresponding buckets;

creating a processing thread to access a target data item with an associated key;

hashing the key of the target data item;

selecting one of the subtables using the hashed key;

acquiring a subtable lock for the selected subtable;

choosing a bucket within the subtable using the hashed key;

acquiring a bucket lock associated with the chosen bucket;

releasing the subtable lock after said setting the bucket lock;

loading a single bucket node from the chosen bucket into a cache memory; and comparing the hashed key with the hash signatures of the multiple signature-pointer pairs contained in the bucket node loaded in the cache memory.

60. A computer-readable medium having computer executable instructions for directing a processor to:

hash a key of a target data item that is stored in memory;

use the hashed key to access a bucket in a hash table, the bucket containing a reference to a linked list of bucket nodes that hold references to data items with keys that hash to the bucket;

load a first bucket node from the hash table into a cache, the first bucket node comprising multiple signature-pointer pairs, each signature-pointer pair comprising a hash signature computed from a key of a data item and a pointer to the data item;

hash a key of a target data item; and compare the hashed key with the hash signatures of the signature-pointer pairs in the cache memory.

61. A computer-readable medium as recited in claim 60, further comprising instructions to direct the processor to set a spin lock on the cache memory.

62. A hash table embodied as a data structure stored on a computer-readable medium, the hash table comprising:

multiple buckets, each bucket containing a reference to a linked list of bucket nodes that hold references to data items with keys that hash to a common bucket;

first bucket nodes from each of the linked lists of bucket nodes stored in corresponding ones of the buckets; and wherein individual first bucket nodes contain multiple signature-pointer pairs, each signature-pointer pair comprising a hash signature computed from a key of a data item and a pointer to the data item.

63. A hash table as recited in claim 62, further comprising:

a table lock that can be set to govern access to the table; and multiple bucket locks for corresponding ones of the buckets, each bucket lock being selectively set to govern access to the corresponding bucket.

64. A hash table as recited in claim 62, further comprising multiple subtables, each subtable having multiple buckets.

65. The system as recited in claim 20, wherein the reference to a linked list of bucket nodes comprises a pointer that points to the location of bucket nodes stored outside the hash table.

66. The system as recited in claim 20, wherein the first bucket nodes stored in the hash table are configured to make reference to other bucket nodes stored outside the table.

67. The system as recited in claim 20, wherein the hash table is configured to automatically store only the first bucket nodes in the hash table.

68. The system as recited in claim 26, wherein the reference to a linked list of bucket nodes comprises a pointer that points to the location of bucket nodes stored outside the hash table.

69. The system as recited in claim 26, wherein the first bucket nodes stored in the hash table are configured to make reference to other bucket nodes stored outside the table.

70. The system as recited in claim 26, wherein the hash table is configured to automatically store only the first bucket nodes in the hash table.

* * * * *

UNITED STATES PATENT AND TRADEMARK OFFICE
CERTIFICATE OF CORRECTION

PATENT NO.     : 6,578,131 B1
DATED          : June 10, 2003
INVENTOR(S)    : Larson et al.

It is certified that error appears in the above-identified patent and that said Letters Patent is hereby corrected as shown below:

Column 3,
Line 51, replace "tablet" with -- table --.

Column 6,
Line 51, replace "While" with -- while --.

Column 14,
Line 42, replace "bash" with -- hash --.

Signed and Sealed this

Fourteenth Day of October, 2003

JAMES E. ROGAN
*Director of the United States Patent and Trademark Office*